US009145928B2

(12) United States Patent
Li et al.

(10) Patent No.: US 9,145,928 B2
(45) Date of Patent: Sep. 29, 2015

(54) TRANSMISSION WITH REAR TORQUE CONVERTER

(71) Applicants: Jianwen Li, Vaughan (CA); Richard D. Muizelaar, Mississauga (CA)

(72) Inventors: Jianwen Li, Vaughan (CA); Richard D. Muizelaar, Mississauga (CA)

(73) Assignee: Magna Powertrain, Inc., Concord, Ontario (CA)

( * ) Notice: Subject to any disclaimer, the term of this patent is extended or adjusted under 35 U.S.C. 154(b) by 0 days.

(21) Appl. No.: 14/048,288

(22) Filed: Oct. 8, 2013

(65) Prior Publication Data
US 2014/0033863 A1 Feb. 6, 2014

Related U.S. Application Data

(63) Continuation of application No. 12/679,560, filed as application No. PCT/CA2008/001679 on Dec. 26, 2008, now Pat. No. 8,549,943.

(60) Provisional application No. 60/975,547, filed on Sep. 26, 2007.

(51) Int. Cl.
*F16H 3/08* (2006.01)
*F16D 21/06* (2006.01)
*F16H 3/00* (2006.01)
*F16H 47/06* (2006.01)
*F16H 3/02* (2006.01)

(52) U.S. Cl.
CPC .............. *F16D 21/06* (2013.01); *F16H 3/006* (2013.01); *F16H 3/02* (2013.01); *F16H 47/06* (2013.01); *F16H 2200/0047* (2013.01); *F16H 2200/0052* (2013.01); *Y10T 74/19009* (2015.01); *Y10T 74/19037* (2015.01); *Y10T 74/19228* (2015.01)

(58) Field of Classification Search
USPC ........................................... 74/330, 333, 340
See application file for complete search history.

(56) References Cited

U.S. PATENT DOCUMENTS

2003/0183029 A1* 10/2003 Shimaguchi ................ 74/333
2005/0252325 A1 11/2005 Stevenson
2014/0033863 A1 2/2015 Li

FOREIGN PATENT DOCUMENTS

FR 496251 A 10/1919
GB 517519 A 2/1940

* cited by examiner

*Primary Examiner* — Ha D Ho
(74) *Attorney, Agent, or Firm* — Dickinson Wright PLLC

(57) ABSTRACT

A transmission includes a main shaft, a first input shaft, a second input shaft, and a first clutch to drivingly couple the main shaft and the first input shaft. A second clutch drivingly couples the main shaft and the second input shaft. A torque converter is selectively driven by one of the first input shaft and a first speed gear set. The first speed gear set is driven by the other of the first input shaft and the torque converter. A second speed gear set is driven by the second input shaft.

25 Claims, 9 Drawing Sheets

TRANSMISSION WITH REAR TORQUE CONVERTER

CROSS-REFERENCE TO RELATED APPLICATIONS

This application is a continuation of U.S. Ser. No. 12/679,560 filed Mar. 23, 2010 which is a U.S. National Stage of International Application No. PCT/CA2008/001679 filed Dec. 26, 2008 which claims the benefit of U.S. Provisional Application No. 60/975,547 filed Sep. 26, 2007. The disclosure of the above applications are incorporated herein by reference in their entirety.

BACKGROUND

The present disclosure generally relates to power transmission devices, and, more particularly, to a transmission having a selectively operational torque converter.

Many vehicle automatic transmissions are equipped with a torque converter installed at the input end of the transmission. The torque converter is typically the component directly coupled to an output shaft of the engine. Accordingly, whenever the automatic transmission is operated, the torque converter is rotated. Due to the relative rotation of components in the torque converter, some energy is converted to heat. An energy loss occurs and efficiency of the transmission is reduced by operation of the torque converter. Furthermore, it should be appreciated that conventional transmissions require the torque converter to rotate for every gear ratio provided by the transmission. This rotating inertia of the torque converter reduces the overall efficiency of the drivetrain.

Torque converters may provide a number of desirable features including torque multiplication depending on the relative speed differential between the input to the torque converter and the output. Furthermore, torque converters may allow a transmission to remain in first gear when the vehicle is stopped while also providing a transfer of torque during launch when requested by the vehicle operator. While many of the benefits of using a torque converter in an automatic transmission may still exist, it may be desirable to increase the efficiency of power transfer.

SUMMARY

A transmission includes a main shaft, a first input shaft, a second input shaft and a first clutch to drivingly couple the main shaft and the first input shaft. A second clutch drivingly couples the main shaft and the second input shaft. A torque converter is selectively driven by one of the first input shaft and a first speed gear set. The first speed gear set is driven by the other of the first input shaft and the torque converter. A second speed gear set is driven by the second input shaft.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
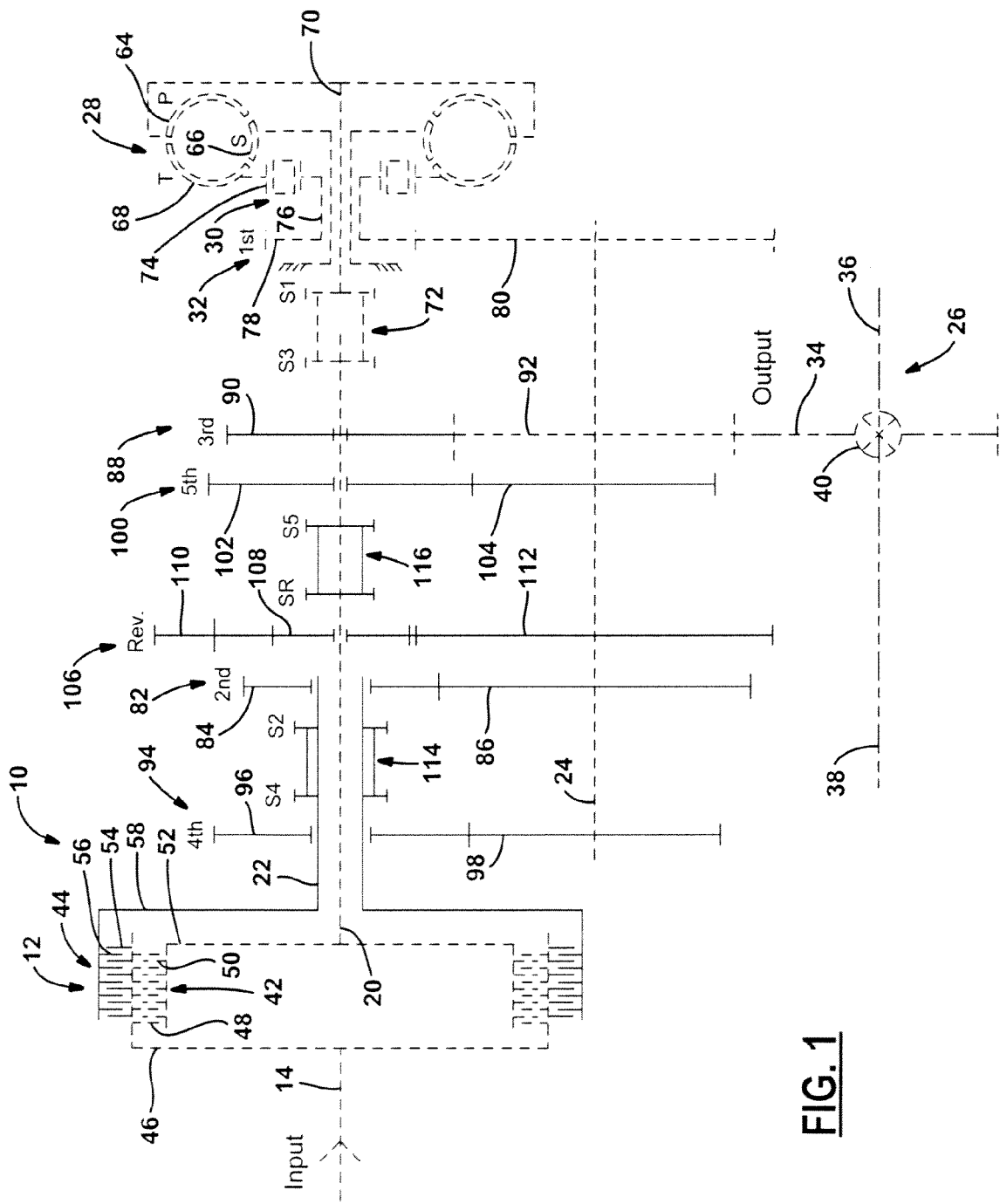
FIG. 1 is a schematic depicting a transmission having a selectively operable torque converter depicting a power flow for a first gear drive ratio.

The following description is merely exemplary in nature and is not intended to limit the present disclosure, application, or uses. It should be understood that throughout the drawings, corresponding reference numerals indicate like or corresponding parts and features.

FIG. 1 is a schematic representing a transmission 10 having a dual clutch 12 driven by a main shaft 14. During operation of dual clutch 12, torque may be transferred from main shaft 14 to one or both of a first input shaft 20 and a second input shaft 22. Second input shaft 22 is shaped as a tube having at least a portion of first input shaft 20 extending therethrough. Speed gear sets are selectively operable to transfer torque from one of first input shaft 20 and second input shaft 22 to a countershaft 24. Power may be transferred from countershaft 24 to a final drive unit 26 via one of the speed gears coupled thereto. A torque converter 28 and a one-way clutch 30 may be selectively drivingly coupled to first input shaft 20 to provide multiplied torque to a first speed gear set 32. First speed gear set 32 transfers torque to countershaft 24 and final drive unit 26. Final drive unit 26 includes a final drive gear 34 fixed for rotation with a differential 40. A first axle shaft 36 and a second axle shaft 38 are drivingly connected to differential 40. Torque converter 28 is located at an end of transmission 10 opposite the input. In this manner, torque converter 28 need not be part of a power flow through transmission 10 for each drive ratio provided. In particular, torque converter 28 is energized only during the first gear ratio. Energy losses due to the generation of heat by torque converter 28 are avoided for all other drive ratios. The rotating inertia losses are only present in first gear.

Dual clutch 12 includes a first clutch 42 and a second clutch 44. First clutch 42 is selectively operable to transfer torque from main shaft 14 to first input shaft 20. Similarly, second clutch 44 is selectively operable to transfer torque from main shaft 14 to second input shaft 22. A common hub and drum 46 is fixed to main shaft 14. First clutch 42 includes a set of outer first clutch plates 48 fixed for rotation with common hub and drum 46. Accordingly, element 46 acts as a drum for the first clutch 42. Outer first clutch plates 48 are axially moveable relative to common hub and drum 46.

A set of inner first clutch plates 50 are fixed for rotation with a hub 52. Hub 52 is fixed to first input shaft 20. Inner first clutch plates 50 are interleaved with outer first clutch plates 48. An actuator (not shown) may be operable to compress outer first clutch plates 48 with inner first clutch plates 50 to transfer torque through first clutch 42.

A set of inner second clutch plates 54 are fixed for rotation with common hub and drum 46. Element 46 functions as a hub for second clutch 44. A set of outer clutch plates 56 are fixed for rotation with a drum 58. Drum 58 is fixed to second input shaft 22. Inner second clutch plates 54 are arranged in an interleaved pattern with outer second clutch plates 56. Another actuator (not shown) may be operable to cause torque to transfer through second clutch 44.

Torque converter 28 includes a pump 64, a stator 66 and turbine 68. Pump 64 is fixed for rotation with a drive shaft 70. Drive shaft 70 rotates about an axis aligned with the axis about which first input shaft 20 rotates. A first dual synchronizer 72 is operable to selectively drivingly couple first input shaft 20 and drive shaft 70. Stator 66 is fixed to ground and restricted from rotation. Turbine 68 is coupled to an outer ring 74 of one-way clutch 30. When one-way clutch 30 is locked, rotation of turbine 68 causes torque to transfer from outer ring 74 to an inner ring 76. Inner ring 76 is fixed for rotation with a first drive gear 78 associated with first speed gear set 32. Slower rotation of turbine 68 and outer ring 74 with respect to inner ring 76 and first drive gear 78 is a result of free wheeling one-way clutch 30. First speed gear set 32 also includes a first driven gear 80 in meshed engagement with first drive gear 78. First driven gear 80 is fixed for rotation with countershaft 24.

A second speed gear set 82 includes a second drive gear 84 rotatably supported on second input shaft 22. A second driven gear 86 is positioned in meshed engagement with second drive gear 84. Second driven gear 86 is fixed for rotation with countershaft 24. A third speed gear set 88 includes a third drive gear 90 rotatably supported on first input shaft 20. A third driven gear 92 is in meshed engagement with third drive gear 90. Third driven gear 92 is fixed for rotation with countershaft 24 and is also meshingly engaged with final drive gear 34.

A fourth speed gear set 94 includes a fourth drive gear 96 rotatably supported on second input shaft 22. A fourth driven gear 98 is in meshed engagement with fourth drive gear 96. Fourth driven gear 98 is fixed for rotation with countershaft 24. A fifth speed gear set 100 includes a fifth drive gear 102 rotatably supported on first input shaft 20. A fifth driven gear 104 is in meshed engagement with fifth drive gear 102. Fifth driven gear 104 is fixed for rotation with countershaft 24. A reverse gear set 106 includes a reverse drive gear 108 rotatably supported on first input shaft 20, a reverse idler gear 110 and a reverse driven gear 112. Reverse idler gear 110 is in meshed engagement with reverse drive gear 108 and reverse driven gear 112. Reverse driven gear 112 is fixed for rotation with countershaft 24. Transmission 10 further includes a second dual synchronizer 114 and a third dual synchronizer 116 that will be described in greater detail hereinafter.

FIGS. 1-6 depict power flow through the various components of transmission 10 for each of the first through fifth forward drive gears as well as the reverse drive gear. FIG. 1 shows first dual synchronizer 72 shifted to the right to drivingly interconnect first input shaft 20 and drive shaft 70. First clutch 42 is actuated to transfer torque from main shaft 14 to first input shaft 20. Torque passes from first input shaft 20 through first dual synchronizer 72, drive shaft 70 and through torque converter 28. Turbine 68 rotates in a direction to transfer torque through one-way clutch 30 such that power is transmitted from outer ring 74 to inner ring 76 and first drive gear 78. The torque transfer through one-way clutch 30 occurs when outer ring 74 rotates at a greater speed than inner ring 76. Rotation of first drive gear 78 causes rotation of first driven gear 80 as well as countershaft 24 and third driven gear 92. Torque exits transmission 10 from third driven gear 92.

Because the relative difference in rotational speed between first input shaft 20 and axle shafts 36, 38 is greatest at low vehicle speeds, it may be beneficial to utilize torque converter 28 in association with first speed gear set 32. Torque converter 28 provides a torque multiplication factor up to about a factor of 2 when high relative speed differences are present. Accordingly, the size and number of gears required to provide a first gear drive ratio may be reduced when coupled to torque converter 28. Furthermore, torque converter 28 allows engagement of first clutch 42 and a driving connection between first input shaft 20 and drive shaft 70 to be maintained while the engine is running and the vehicle is stopped. When a vehicle launch is desired, torque is transferred through torque converter 28 and the components previously discussed to final drive unit 26. When inner ring 76 rotates at a greater speed than outer ring 74, one-way clutch 30 free wheels and does not transfer torque to outer ring 74.

Figure 2:
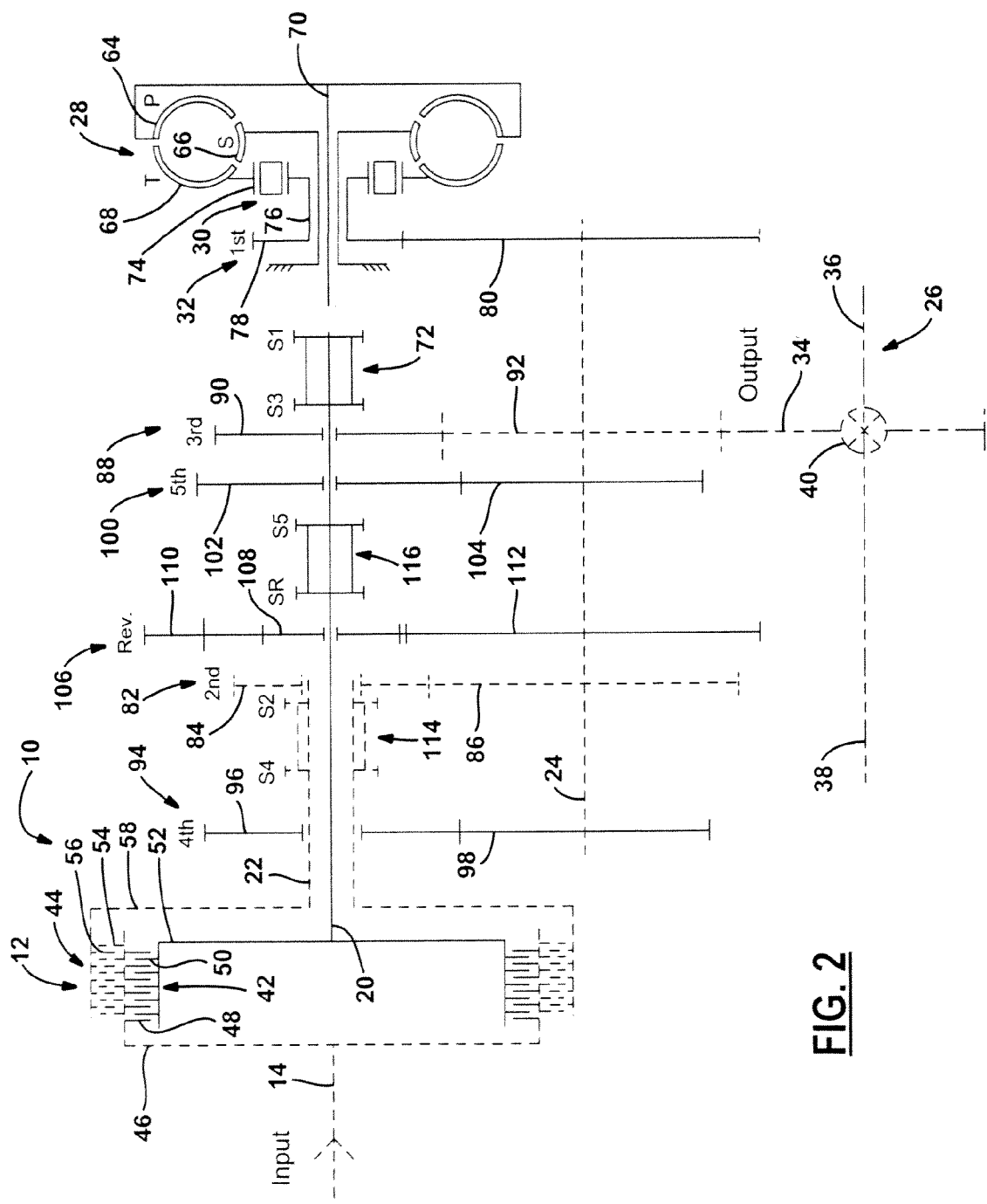
FIG. 2 depicts a power flow when the transmission provides a second gear ratio.

Once the vehicle is traveling a speed sufficient to accept a shift from first gear to second gear, torque converter 28 may no longer be a necessary component to provide a torque multiplication function. On the contrary, efficiency losses associated with the use of torque converter 28 may outweigh benefits gained by the torque multiplication feature. As such, the power flow for second gear depicted in FIG. 2 shows pre-selecting the second dual synchronizer 114 to shift to the right to drivingly interconnect second drive gear 84 with second input shaft 22. First clutch 42 is disengaged and second clutch 44 is engaged at the same time. There is a time overlap between the two clutches disengaging and engaging. Finally, the first dual synchronizer 72 is moved to a neutral position to disconnect first input shaft 20 from drive shaft 70. The torque is transferred from main shaft 14 to second input shaft 22. Torque continues to transfer through second dual synchronizer 114, second drive gear 84, second driven gear 86, countershaft 24, third driven gear 92, and also first driven gear 80. Since the first driving gear 78 is meshed with first driven gear 80, the first driving gear 78 and inner ring 76 of one-way clutch 30 are rotated, but their rotating speed is greater than outer ring 74, so one-way clutch 30 is free wheeling and torque is not transferred to outer ring 74. It should be appreciated that power is not transferred to torque converter 28 at this time. Furthermore, torque converter 28 is not energized for any gear other than first gear. Accordingly, the pumping losses associated with torque converter 28 are only realized when operating transmission 10 in first gear.

Figure 3:
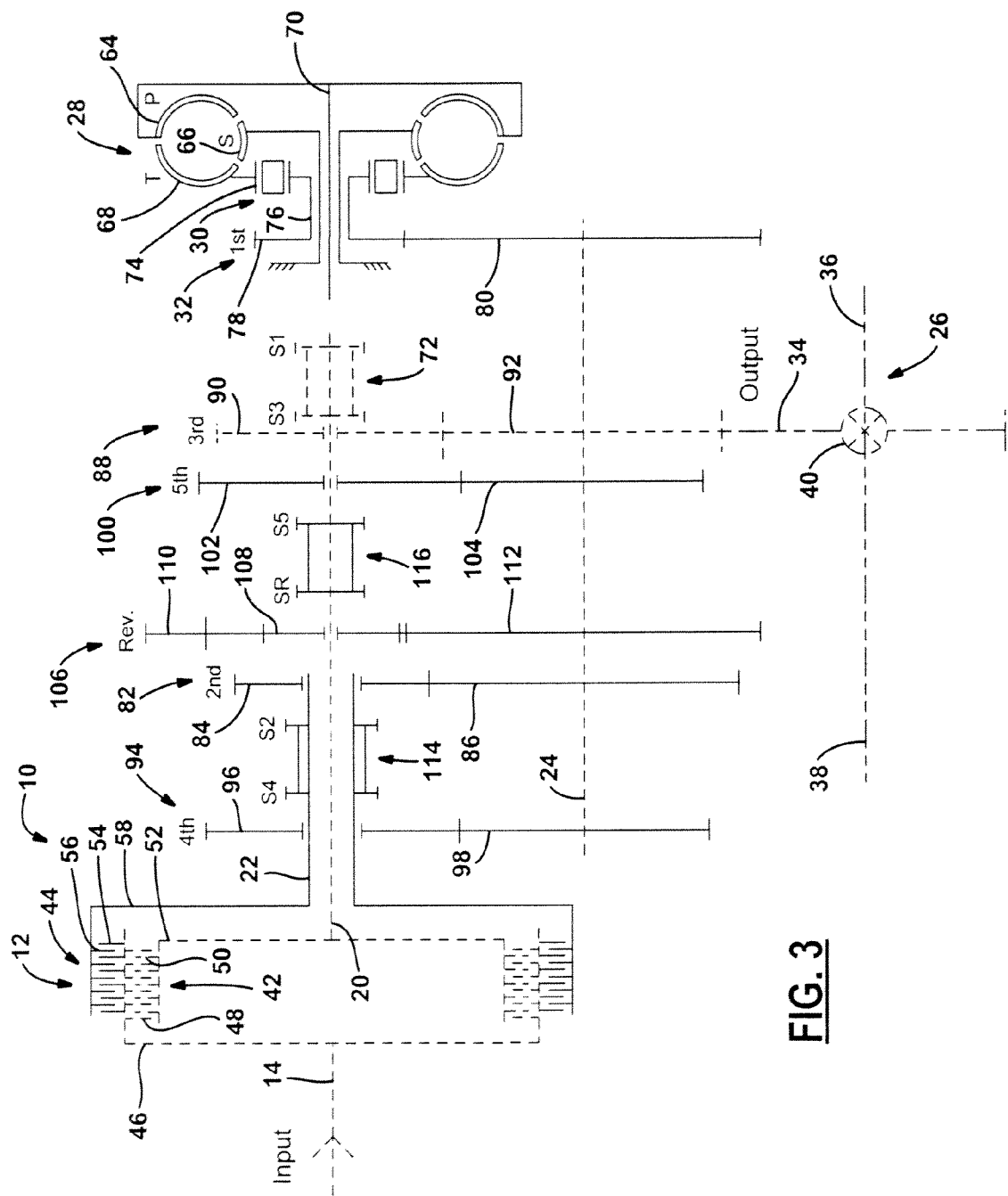
FIG. 3 depicts a power flow when the transmission provides a third gear ratio.

FIG. 3 depicts the power flow through transmission 10 for a third gear ratio. To shift from second gear to third gear, first dual synchronizer 72 is indexed to the left to drivingly couple third drive gear 90 to first input shaft 20. Second clutch 44 is disengaged while first clutch 42 is engaged. Second dual synchronizer 114 may be moved to its neutral position to disconnect second drive gear 84 from second input shaft 22. Accordingly, power flows from main shaft 14 through first clutch 42, first input shaft 20, first dual synchronizer 72, third drive gear 90 and third driven gear 92.

Figure 4:
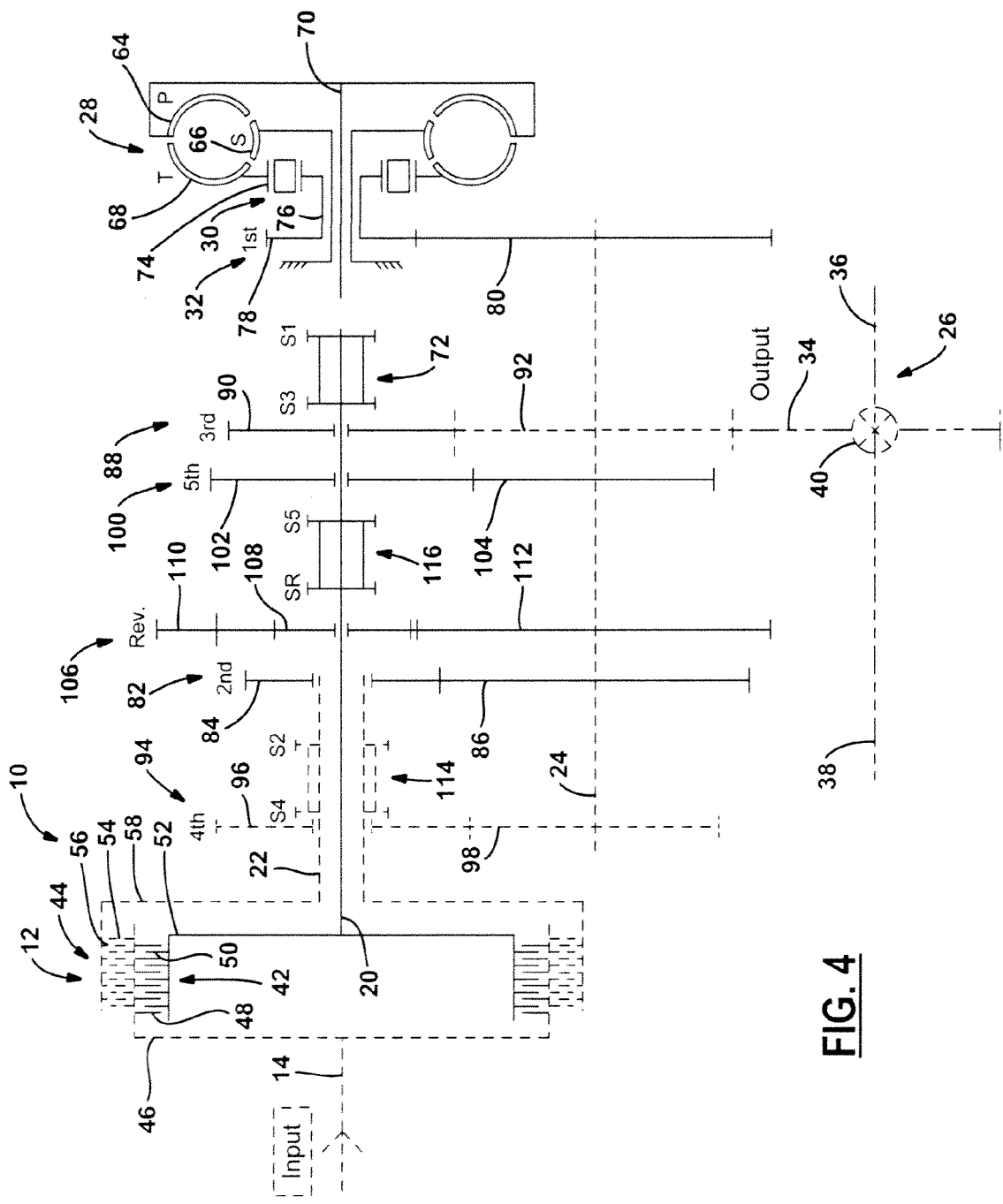
FIG. 4 depicts a power flow when the transmission provides a fourth gear ratio.

FIG. 4 shows the power flow through various components of transmission 10 during operation in fourth gear. Second dual synchronizer 114 is indexed to the left to drivingly couple fourth drive gear 96 with second input shaft 22. First clutch 42 is disengaged while second clutch 44 is engaged. First dual synchronizer 72 may be moved to its neutral position to disengage third drive gear 90 from first input shaft 20. After the third to fourth gear shift has been completed, power flows from main shaft 14, through second clutch 44, second input shaft 22, second dual synchronizer 114, fourth drive gear 96, fourth driven gear 98, countershaft 24 and third driven gear 92.

Figure 5:
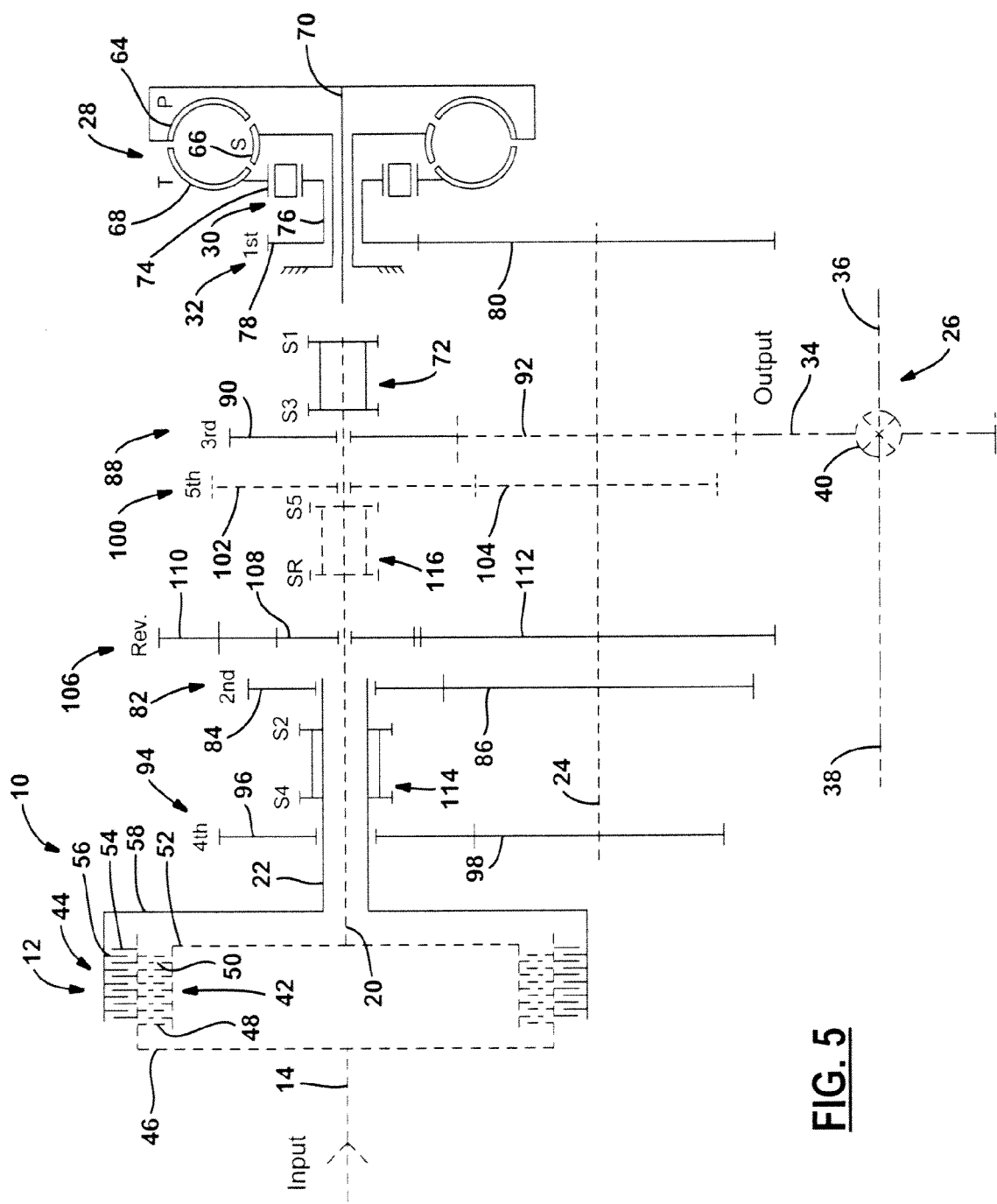
FIG. 5 depicts a power flow when the transmission provides a fifth gear ratio.

FIG. 5 depicts fifth gear operation and power flow. To transfer power in fifth gear, third dual synchronizer 116 is indexed to the right to drivingly couple fifth drive gear 102 with first input shaft 20. Second clutch 44 is disengaged while first clutch 42 is engaged. Second dual synchronizer 114 may be indexed to its neutral position to disengage fourth drive gear 96 from second input shaft 22. Once fifth gear has been established, power travels through main shaft 14, first clutch 42, first input shaft 20, third dual synchronizer 116, fifth drive gear 102, fifth driven gear 104, countershaft 24 and third driven gear 92.

Figure 6:
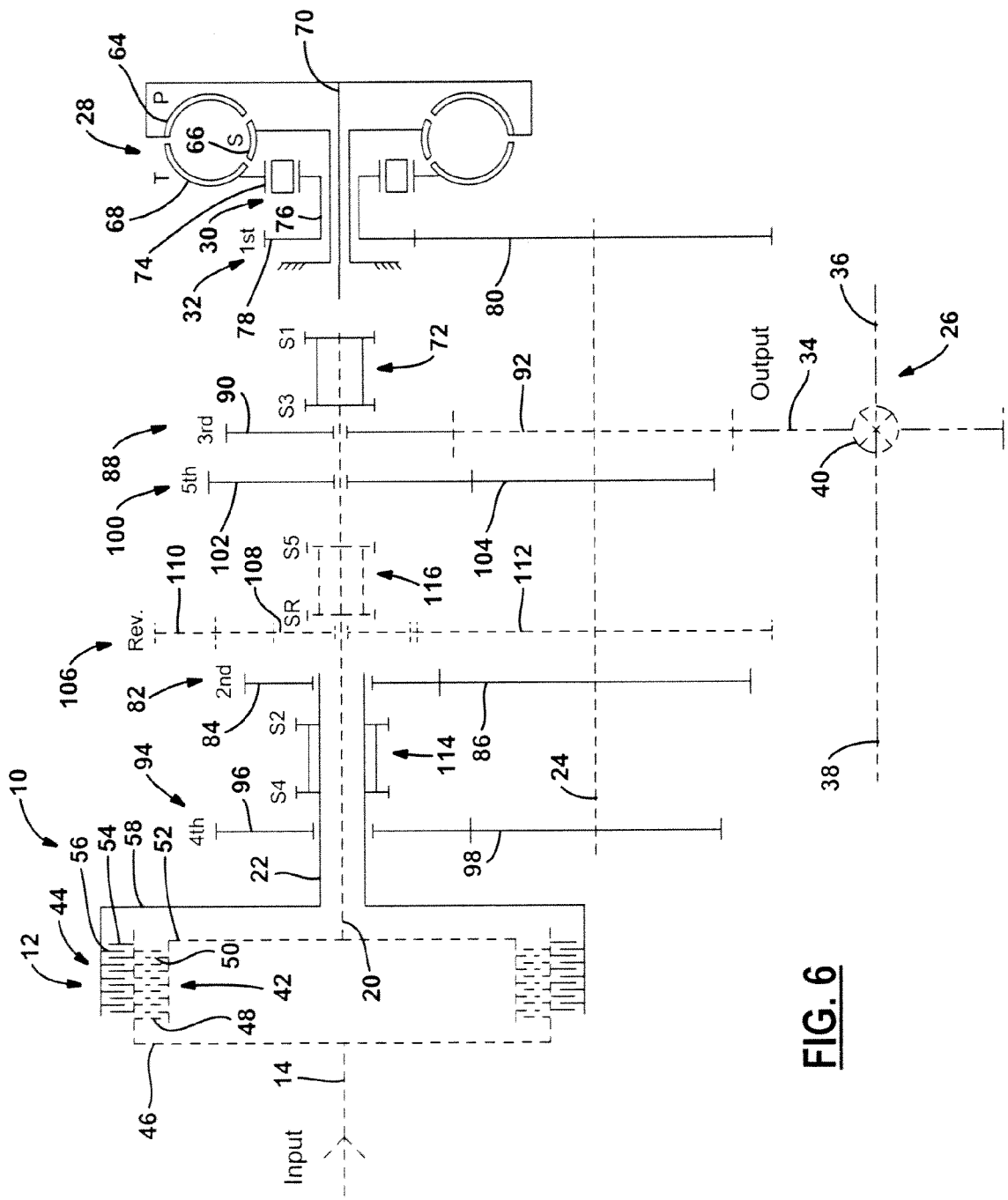
FIG. 6 depicts a power flow when the transmission provides a reverse gear ratio.

FIG. 6 shows transmission 10 being operated in a reverse gear. In reverse gear, third dual synchronizer 116 is shifted to the left to drivingly couple reverse drive gear 108 with first input shaft 20. Power travels from main shaft 14 through first clutch 42, first input shaft 20, third dual synchronizer 116, reverse drive gear 108, reverse idler gear 110, reverse driven gear 112, countershaft 24 and third driven gear 92.

Figure 7:
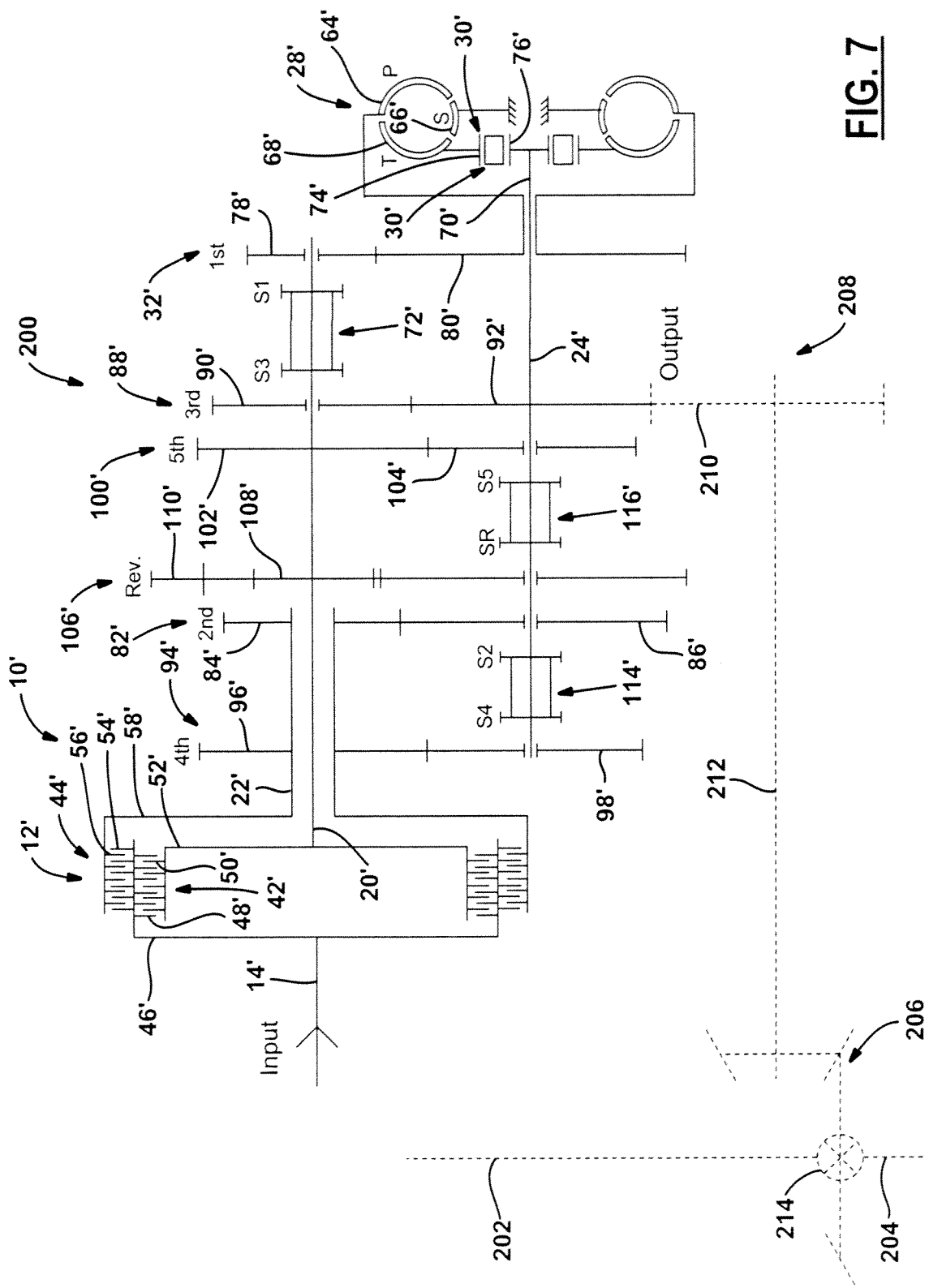
FIG. 7 is a schematic depicting another transmission having a rear mounted torque converter.

FIG. 7 depicts another transmission with a rear torque converter identified at reference numeral 200. Transmission 200 is substantially similar to transmission 10 as being a five forward speed and one reverse speed transmission having a dual clutch, three dual synchronizers and a rear torque converter. However, the arrangement of the various components has been modified to provide a transmission having a different overall outer shape. As such, it is contemplated that transmission 10 may be transversely oriented relative to the vehicle direction of travel, and transmission 200 may be longitudinally oriented relative to a vehicle direction of travel. Transmission 10 also can be longitudinally oriented by changing the arrangement of final drive unit 26. Transmission 200 also can be transversely oriented by changing the arrangement of the final drive unit 208. To provide output torque to a first axle shaft 202 as well as a second axle shaft 204, a hypoid gear set 206 is provided as part of a final drive unit 208 driven by transmission 200. Final drive unit 208 also includes a final drive gear 210, a transfer shaft 212 and a differential 214 interconnecting first axle shaft 202 and second axle shaft 204. Because the remaining components of transmission 200 are substantially similar to the components introduced in relation to transmission 10, the previously introduced reference numerals will be used and may include a prime suffix to indicate like elements.

The main differences between transmission 200 and transmission 10 lie in the positioning of torque converter 28' and one-way clutch 30' being associated with countershaft 24' as opposed to the manner previously described. First speed gear set 32' includes first drive gear 78' supported for rotation on first input shaft 20'. First dual synchronizer 72' selectively couples first drive gear 78' to first input shaft 20'. First driven gear 80' is fixed for rotation with pump 64' of torque converter 28'. Inner ring 76' of one-way clutch 30' is fixed for rotation with countershaft 24' while outer ring 74' is fixed for rotation with turbine 68'. A first gear drive ratio of transmission 200 is achieved by transferring torque from main shaft 14' through first clutch 42', first input shaft 20', first dual synchronizer 72', first drive gear 78', first driven gear 80', torque converter 28', one-way clutch 30', countershaft 24' and third driven gear 92'. As previously described, torque converter 28' functions only in relation to the first gear drive ratio. Torque is not transferred through torque converter 28' for second, third, fourth, fifth or the reverse gear drive ratios.

The remaining speed gear sets are similar to the speed gear sets of transmission 10 except that second dual synchronizer 114' and third dual synchronizer 116' are associated with countershaft 24'. Accordingly, the drive gears of second speed gear set 82', fourth speed gear set 94', fifth speed gear set 100' and reverse speed gear set 106' are fixed for rotation with one of first input shaft 20' or second input shaft 22'. The associated driven gears of the previously listed speed gear sets are supported for rotation on countershaft 24'. The driven gears may be selectively coupled to countershaft 24' through operation of one of second dual synchronizer 114' and third dual synchronizer 116'. Third speed gear set 88' remains arranged having drive gear 90' rotatably supported on first input shaft 20' with third driven gear 92' fixed for rotation with countershaft 24'.

Figure 8:
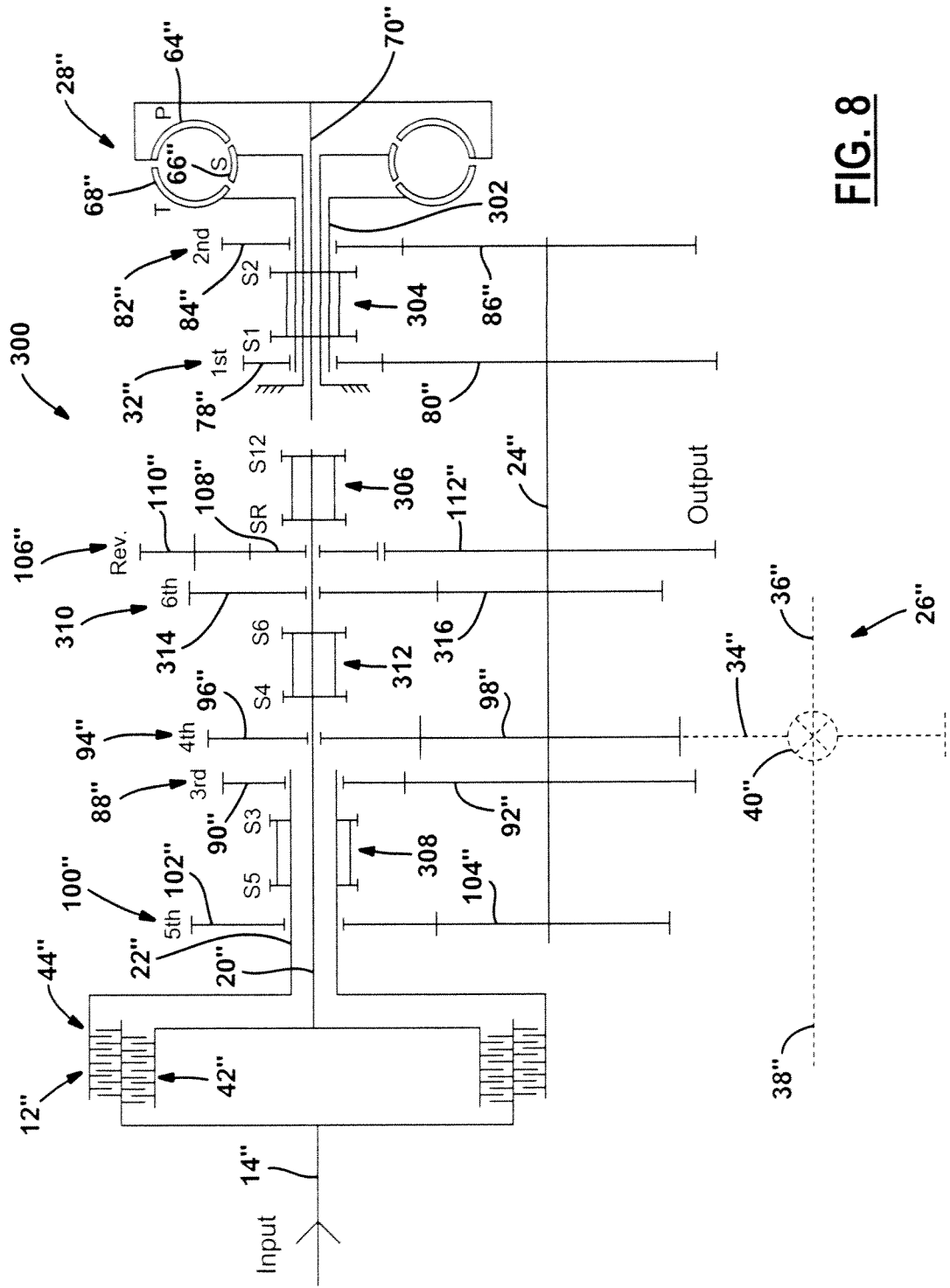
FIG. 8 is a schematic depicting another transmission having a rear mounted torque converter associated with first and second forward gear ratios.

FIG. 8 shows another transmission constructed according to the teachings of the present disclosure identified at reference numeral 300. Transmission 300 is similar to transmissions 10 and 200 but provides six forward drive gear ratios, one reverse gear ratio and has rear torque converter 28" transfer torque for both the first and second drive gear ratios. Transmission 300 includes a number of components substantially similar to transmission 10. Accordingly, like elements will be identified with numerals including a double prime suffix. For example, main shaft 14", dual clutch 12", first input shaft 20" and second input 22" are arranged in the same manner as previously discussed. Similarly, torque converter 28" and drive shaft 70" are positioned to be selectively driven by first input shaft 20". The differences between transmission 300 and transmission 10 include first drive gear 78" of first speed gear set 32" being supported for rotation on a sleeve 302 fixed to turbine 68" of torque converter 28". No one-way clutch is necessary between the sleeve 302 and turbine 68" as shown in relation to transmission 10. Second drive gear 84" is also supported for rotation on sleeve 302. A first dual synchronizer 304 is configured to selectively drivingly couple first drive gear 78" or second drive gear 84" to turbine 68". Each of the driven speed gears are fixed to countershaft 24" as previously described in relation to transmission 10. Furthermore, pump 64" of torque converter 28" rotates about drive shaft 70" aligned with first input shaft 20".

Transmission 300 utilizes torque converter 28" for each of the first and second forward gear ratios. To provide a first gear ratio, main shaft 14" transfers torque through first clutch 42", first input shaft 20" and a second dual synchronizer 306. Second synchronizer 306 is configured to selectively drivingly couple drive shaft 70" or reverse drive gear 108" to first input shaft 20". To establish the first gear ratio, second dual synchronizer 306 drivingly interconnects first input shaft 20" and drive shaft 70". Torque continues to be transferred through torque converter 28", sleeve 302, first dual synchronizer 304, first drive gear 78", first driven gear 80", countershaft 24" and fourth driven gear 98".

Second gear is accomplished by maintaining second dual synchronizer 306 shifted to the right to drivingly interconnect first input shaft 20" with drive shaft 70". When shifting from first gear to second gear, first clutch 42" is disconnected and no torque is provided to first input shaft 20" and drive shaft 70". Then first dual synchronizer 304 is shifted from a leftmost position to a neutral position to disconnect first drive gear 78" and continue to a rightmost position to connect second drive gear 84" to sleeve 302. Finally, first clutch 42" is connected again so torque is transferred from input shaft 14", first input shaft 20", drive shaft 70", torque converter 28", second gear set 82" to countershaft 24". Torque is transferred through torque converter 28" only in relation to the first and second gear ratios. When third, fourth, fifth, sixth or reverse drive gear ratios are provided, torque converter 28" is de-energized. Specifically, second dual synchronizer 306 is disconnected from drive shaft 70". It should be appreciated that the speed gear sets relating to third, fourth, fifth and reverse gears are substantially similar to those previously described with the drive gears of third speed gear set 88" and fifth speed gear set 100" being rotatably supported on second input shaft 22". A third dual synchronizer 308 is operable to selectively drivingly interconnect either of drive gears 90" or 102" with second input shaft 22". Similarly, drive gears for fourth speed gear set 94" and reverse speed gear set 106" as well as a sixth speed gear set 310 are supported for rotation on first input shaft 20".

A fourth dual synchronizer 312 selectively drivingly interconnects fourth drive gear 96" or a sixth drive gear 314 with first input shaft 20". The sixth speed gear set further includes a sixth driven gear 316 in meshed engagement with drive gear 314. Sixth driven gear 316 is fixed for rotation with countershaft 24". To obtain the reverse gear drive ratio, second dual synchronizer 306 is shifted to the left to drivingly interconnect reverse drive gear 108" with first input shaft 20".

Figure 9:
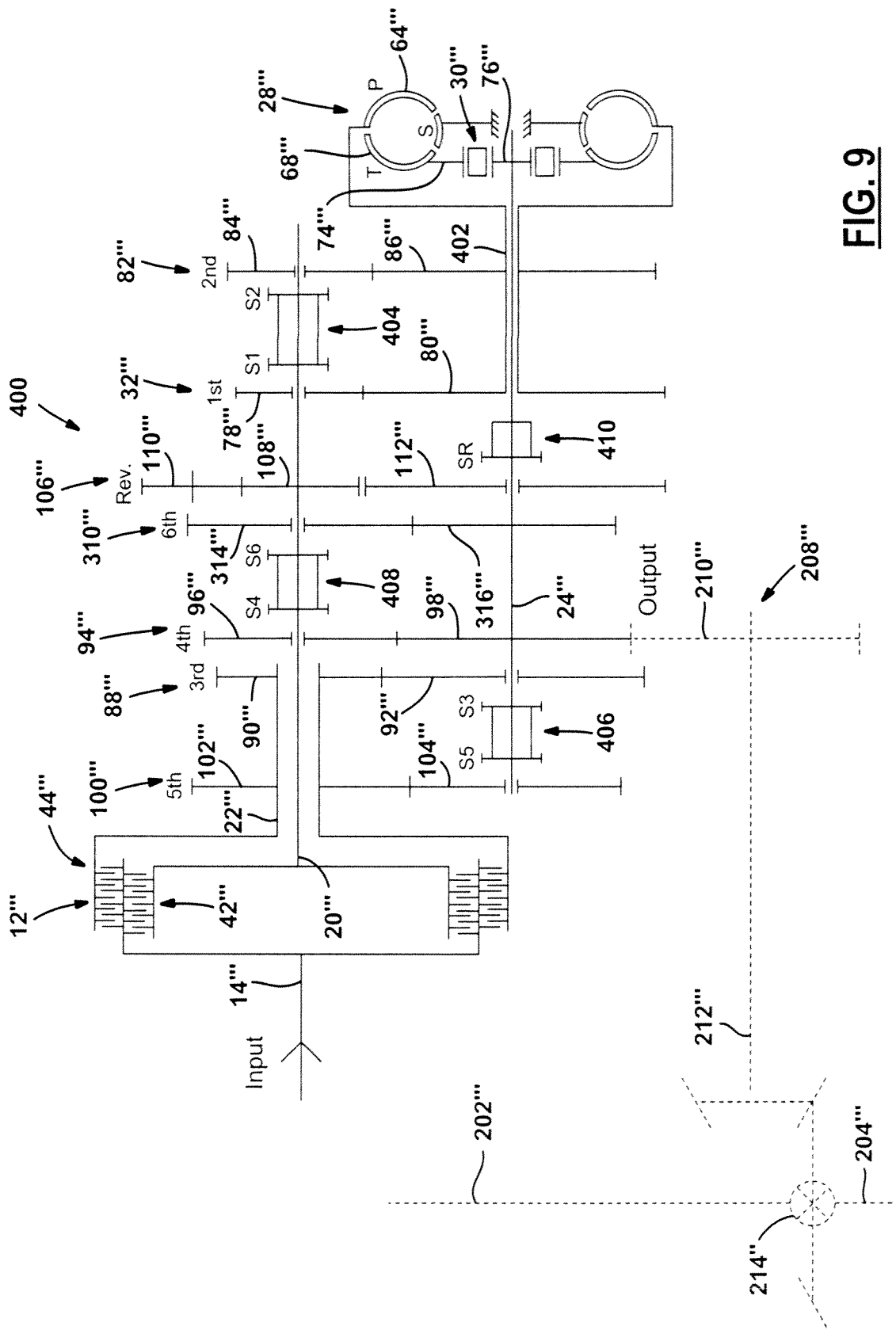
FIG. 9 is a schematic depicting another transmission having a rear mounted torque converter associated with first and second forward gear ratios.

FIG. 9 depicts another transmission identified at reference numeral 400. Transmission 400 provides six forward speed gear ratios and one reverse gear ratio. The rear torque converter is utilized for both of the first and second forward drive gear ratios and has an axis of rotation aligned with the countershaft. Transmission 400 includes many elements substantially similar to those previously described in relation to transmission 200 and transmission 300. Accordingly, like elements will retain their previously introduced reference numerals including a triple prime suffix. Transmission 400 includes first speed gear set 32''', second speed gear set 82''', fourth speed gear set 94''', sixth speed gear set 310''', reverse speed gear set 106''', each being driven by first input shaft 20'''. Third speed gear set 88''' and fifth speed gear set 100''' are driven by second input shaft 22'''. Torque converter 28''' includes pump 64''' fixed for rotation with a tubular shaft or drive shaft 402 at least partially encompassing countershaft 24'''. Driven gears 80''' and 86''' of the first and second speed gear sets are fixed for rotation with tubular shaft 402. One-way clutch 30''' includes outer ring 74''' fixed to turbine 68'''. Inner ring 76''' of one-way clutch 30''' is fixed for rotation with countershaft 24'''.

Transmission 400 also includes a first dual synchronizer 404 operable to selectively couple one of first drive gear 78''' or second drive gear 84''' to first input shaft 20'''. As such, the first and second gear ratios may be provided by operating first dual synchronizer 404 and actuating first clutch 42''' to transfer torque through torque converter 28''', countershaft 24''' and fourth driven gear 98'''. As described in relation to the previous Figures, one of the speed gears fixed to countershaft 24''', in this case, fourth driven gear 98''', is meshingly engaged with final drive gear 210''' of final drive unit 208'''. When shifting from first gear to second gear, first clutch 42''' is disconnected and no torque is provided to first input shaft 20''' and drive shaft 70'''. Then, first dual synchronizer 404 is shifted from leftmost position to the rightmost position to disconnect first drive gear 78''' and drivingly connect second drive gear 84'''. Finally, first clutch 42''' is connected again so torque is transferred from input shaft 14''' through torque converter 28''' and one-way clutch 30''' to countershaft 24'''.

A second dual synchronizer 406 may be operated to selectively drivingly couple third driven gear 92''' or fifth driven gear 104''' to countershaft 24'''. A third dual synchronizer 408 is selectively operable to drivingly interconnect fourth drive gear 96''' or sixth drive gear 314''' with first input shaft 20'''. A single synchronizer 410 may be actuated to drivingly couple reverse driven gear 112''' and countershaft 24''' to provide the reverse gear ratio.

Furthermore, the foregoing discussion discloses and describes merely exemplary embodiments of the present disclosure. One skilled in the art will readily recognize from such discussion, and from the accompanying drawings and claims, that various changes, modifications and variations may be made therein without departing from the spirit and scope of the disclosure as defined in the following claims.

What is claimed is:

1. A transmission comprising:
 a main shaft;
 a first input shaft;
 a second input shaft;
 a first clutch to drivingly couple the main shaft and the first input shaft;
 a second clutch to drivingly couple the main shaft and the second input shaft;
 a torque converter selectively driven by the first input shaft;
 a first speed gear set being driven by the torque converter; and
 a second speed gear set rotatably supported on the second input shaft;
 wherein each of the speed gear sets includes a gear fixed for rotation with a countershaft.

2. The transmission of claim 1 further including a one-way clutch driven by the torque converter and driving the first speed gear set.

3. The transmission of claim 2 further including a third speed gear set driven by the first input shaft.

4. The transmission of claim 3 further including a fourth speed gear set driven by the second input shaft.

5. The transmission of claim 4 further including a fifth speed gear set driven by the first input shaft.

6. The transmission of claim 5 further including a reverse speed gear set driven by the first input shaft.

7. The transmission of claim 2 wherein the one-way clutch includes a first member driven by a turbine of the torque converter and a second member driving a first drive gear of the first speed gear set.

8. The transmission of claim 7 wherein a first driven gear is in meshed engagement with the first drive gear, the first driven gear being fixed for rotation with a countershaft extending substantially parallel to the first input shaft.

9. The transmission of claim 1 further including a drive shaft fixed for rotation with a pump of the torque converter, and a first synchronizer operable to selectively connect and disconnect the drive shaft and the first input shaft.

10. The transmission of claim 9 wherein the drive shaft and the first input shaft rotate about a common axis.

11. The transmission of claim 1 wherein the first and second input shafts rotate about a common axis.

12. The transmission of claim 11 wherein the first and second clutches share a common hub and drum.

13. The transmission of claim 1 wherein the first speed gear set is positioned upstream of the torque converter, the torque converter and the first input shaft rotating about a common axis.

14. The transmission of claim 1 wherein the torque converter, the first input shaft, and the second input shaft rotate about a common axis; and
 the first speed gear set is positioned upstream of the torque converter, and the second speed gear set is position upstream of the first speed gear set.

15. The transmission of claim 14, wherein the first and second speed gear sets are operable to transfer torque from the input shaft to a countershaft, the countershaft transfers torque to a final drive unit, the final drive unit includes a final drive gear fixed for rotation with a differential, and a pair of axle shafts are drivingly connected to the differential.

16. A transmission comprising:
a main shaft;
a first input shaft;
a second input shaft;
a first clutch to drivingly couple the main shaft and the first input shaft;
a second clutch to drivingly couple the main shaft and the second input shaft;
a torque converter selectively driven by the first input shaft,
a first speed gear set being driven by the torque converter;
a second speed gear set rotatably supported on the second input shaft; and
a third speed gear set rotatably supported on the first input shaft.

17. The transmission of claim 16 further including the torque converter directly driving the first and second speed gear sets.

18. The transmission of claim 16 further including a one-way clutch driven by the torque converter and driving a countershaft.

19. The transmission of claim 18 wherein the first and second speed gear sets are positioned upstream of the torque converter, the torque converter and the countershaft rotating about a common axis.

20. The transmission of claim 18 wherein the one-way clutch includes a first member driven by a turbine of the torque converter and a second member driving the countershaft.

21. The transmission of claim 16 wherein the first and second input shafts rotate about a common axis.

22. The transmission of claim 16 wherein the torque converter, the first input shaft, and the second input shaft rotate about a common axis; and
the first speed gear set is positioned upstream of the torque converter, and the second speed gear set is position upstream of the first speed gear set.

23. The transmission of claim 22, wherein the first and second speed gear sets are operable to transfer torque from the input shaft to a countershaft, the countershaft transfers torque to a final drive unit, the final drive unit includes a final drive gear fixed for rotation with a differential, and a pair of axle shafts are drivingly connected to the differential.

24. A transmission comprising:
a main shaft;
a first input shaft;
a second input shaft;
a first clutch to drivingly couple the main shaft and the first input shaft;
a second clutch to drivingly couple the main shaft and the second input shaft;
a torque converter selectively driven by the first input shaft;
a first speed gear set being driven by the torque converter;
a second speed gear set rotatably supported on the second input shaft;
a drive shaft driven by the torque converter; and
a synchronizer operable to selectively connect and disconnect the drive shaft and the first input shaft.

25. A transmission comprising:
a main shaft;
a first input shaft;
a second input shaft;
a first clutch to drivingly couple the main shaft and the first input shaft;
a second clutch to drivingly couple the main shaft and the second input shaft;
a torque converter selectively driven by the first input shaft;
a first speed gear set being driven by the torque converter; and
a second speed gear set rotatably supported on the second input shaft;
wherein the torque converter, the first input shaft and the second input shaft rotate about a common axis, and wherein the first speed gear set is positioned upstream of the torque converter, and the second speed gear set is positioned upstream of the first gear set.

* * * * *